United States Patent [19]
Bang

[11] Patent Number: 5,425,683
[45] Date of Patent: Jun. 20, 1995

[54] SINGLE-RING-GEAR PLANETARY TRANSMISSSION UNIT WITH SMALL DIFFERENCE BETWEEN TEETH OF MESHING GEARS

[76] Inventor: Yu A. Bang, No. 11, Building 13, Yangzhuang Xiaoqu, Shijingshan District, Beijing, China

[21] Appl. No.: 118,043

[22] Filed: Sep. 8, 1993

[30] Foreign Application Priority Data

Sep. 25, 1992 [CN] China .................. 92 1 10952.0
Sep. 25, 1992 [CN] China .................. 92 2 20731.3

[51] Int. Cl.⁶ ................................................ F16H 1/32
[52] U.S. Cl. ................................................ 475/162
[58] Field of Search .................. 475/162, 169, 181

[56] References Cited

U.S. PATENT DOCUMENTS

| | | | |
|---|---|---|---|
| 3,876,100 | 4/1975 | Brudi et al. | 475/162 |
| 4,243,355 | 1/1981 | Brudi et al. | 475/162 |
| 4,674,361 | 6/1987 | Parsons | 475/162 |
| 5,009,114 | 4/1991 | Parsons | 475/162 |
| 5,324,240 | 6/1994 | Guttinger | 475/162 |

Primary Examiner—Dirk Wright

[57] ABSTRACT

A single-ring-gear planetary transmission unit with a small difference between teeth includes at least one low-speed shaft which rotates axially; at least one external gear disposed above the low-speed shaft; two high-speed shafts which rotate axially and on each of which at least two eccentric sleeves are rigidly mounted; at least one driving plate, which has two mounting holes rotatably fitted with the eccentric sleeves and at least one driving hole provided with one ring gear that has a few more teeth than those of its corresponding external gear to engage the low-speed shaft; at least one balancing plate which assures a smooth movement of the transmission unit and which has two mounting holes to fit on the high-speed shaft through an eccentric sleeve and one or more shaft-passing portions. The low-speed shaft passes through the driving hole of at least one driving plate, and the external gear on the low-speed shaft is positioned to mesh with the ring gear in the driving hole to achieve a planetary transmission with a small difference between teeth.

11 Claims, 12 Drawing Sheets

SINGLE-RING-GEAR PLANETARY TRANSMISSSION UNIT WITH SMALL DIFFERENCE BETWEEN TEETH OF MESHING GEARS

BACKGROUND

The present invention relates to a transmission unit, and particularly to a planetary transmission unit, in which the two meshing gears have a small difference, for example 1, 2, 3, or 4, in the number of the teeth.

A transmission that has found a wide variety of applications is the planetary transmission with a small difference in the number of teeth of its meshing gears. Chinese Patent Application No. CN 85106692A discloses a three- circle planetary transmission device which includes a high-speed shaft and a low-speed shaft. Three driving sheets, which are made integrally, are eccentrically provided on the high speed shaft and their eccentric directions are circumferentially spaced by 120°. Each of the driving sheets defines a driving hole with annular teeth. An external gear is rigidly fitted on the low-speed shaft and positioned in the driving holes of the sheets with its teeth engaging the teeth in the driving holes of all three driving sheets simultaneously.

It has proved difficult to ensure that the teeth of the external gear engage the teeth of the three sheets uniformly and simultaneously due to fit and manufacturing tolerances noise and heat production during the work of above device. Moreover, this device has high maintenance costs because it uses the three-circle driving sheets.

Chinese Patent Application No. CN89 2 13292.2 also discloses a transmission device. However, the device includes a double crank with one driving sheet. This device produces undesirable vibration because of eccentric load.

Generally, only one speed ratio is obtained from the output shaft of a prior planetary transmission device with a small difference in the number of teeth. If two or more speed ratios are required, a more complicated unit is required resulting in more complex structure and increased volume and weight of the device.

Moreover, in the prior transmission, the rolling bearings provided between the mounting holes of the driving sheets and their corresponding eccentric sleeves are positioned by means of screws threaded in the wall of the mounting holes with their tip ends pressing against the outer rings of the bearings. That arrangement has a disadvantage in that the outer ring of the bearing which deforms as a result of the action exerted by the tips of the screws to adversely impact on the smooth rotation and service life of the bearing.

Accordingly, the object of the invention is to overcome the disadvantages of the prior art and to provide a planetary transmission unit which has a simple structure and runs smoothly, and in which the teeth of the corresponding gears can uniformly mesh and the bearing is uniformly and circumferentially acted on by radial forces.

A further object of the invention is to provide a planetary transmission unit which can provide several speed ratios.

SUMMARY OF THE INVENTION

The present invention provides a single-ring-gear planetary transmission unit with a small difference in the number of teeth, in its gears said transmission comprising:
- at least one low-speed shaft which rotates axially;
- at least one external gear, disposed on the low-speed shaft;
- two high-speed shafts which rotate axially on each of which at least two eccentric sleeves are rigidly mounted;
- at least one driving plate with two mounting holes which are rotatably fitted with the eccentric sleeves and at least one driving hole provided with one ring gear that has a few more teeth than its corresponding external gear to engage with the low-speed shaft;
- at least one balancing plate to assure smooth movement of the transmission unit, the balancing plate having two mounting holes for receiving the high-speed shaft through an eccentric sleeve and one or more shaft-passing portions;
- said low-speed shaft passes through the driving hole of at least one driving plate, and the external gear on the low-speed shaft is positioned to mesh with the ring gear in the driving hole.

According to one embodiment of the invention, the transmission unit comprises a low-speed shaft on which a external gear is rigidly mounted. Three eccentric sleeves are rigidly and serially positioned on each of high-speed shafts according to the dynamic equilibrium method. A driving plate is rotatably mounted on one of the eccentric sleeves and two balancing plates are rotatably mounted on the other eccentric sleeves. The shaft-passing portion of the balancing plate is a shaft-passing hole, and the driving plate has a driving hole. The low-speed shaft passes through the driving hole and the shaft-passing holes.

According to another embodiment of the invention, a plurality of external gears are rotatably mounted on each of at least one low-speed shaft. Each external gear can form a rigid mechanical junction with the low-speed shaft by means of a clutch. Each driving balancing plate has at least one driving hole with a ring gear. All pitch circles of the gear rings of the driving-balancing plates through which a same low-speed passes have the same position with respect to the mounting holes of the corresponding plates. The low-speed shaft passes through the corresponding driving holes, and each external gear meshes with one ring gear.

When a clutch is chosen to connect an external gear and the low-speed shaft, the driving balancing plate with which this external gear engages functions as a working plate and other plates run idle and function as balancing plates.

Preferably, the transmission unit comprises a low-speed shaft with four external gears rotatably mounted thereon, and four driving balancing plates, each of which is provided with a driving hole.

Alternatively, the planetary transmission unit comprises three low-speed shafts and three driving balancing plates. The first low-speed shaft has two external gears rotatably mounted thereon, and two driving-balancing plates each have a driving hole. The other driving balancing plate has a shaft-passing portion. The second low-speed shaft has three external gears rotatably mounted thereon and three driving balancing plates each having a driving hole. The third low-speed shaft has an external gear rigidly mounted thereon. Each of two driving balancing plates have two driving holes and a shaft-passing portion, and the other driving balancing plate has a driving hole.

Preferably, the driving balancing plate is rotatably fitted on a corresponding eccentric sleeve by means of a rolling bearing, and a clearance fit is provided between the outer ring of the bearing and the inner wall of the mounting hole of the plate. The two end portions of the mounting hole have a little deformation to position the outer ring of the rolling bearing axially.

According to the embodiments of the invention, said ring gear may be integral with or separate from the inner wall of its corresponding driving holes.

According to the embodiments of the invention, the gear trains in which an external gear engages with a corresponding ring gear has a different speed ratio, thereby obtaining a plurality of speed ratios from the output shaft by means of controlling the working positions of the clutches.

According to the embodiments of the invention, the clutch may be a jaw clutch, a double-way electromagnetic clutch or a friction clutch.

Further objects and advantages of the invention will appear from the following description taken together with the accompanying drawings.

BRIEF DESCRIPTION OF THE ACCOMPANYING DRAWINGS

DETAILED DESCRIPTION OF THE PREFERRED EMBODIMENTS

Figure 1:
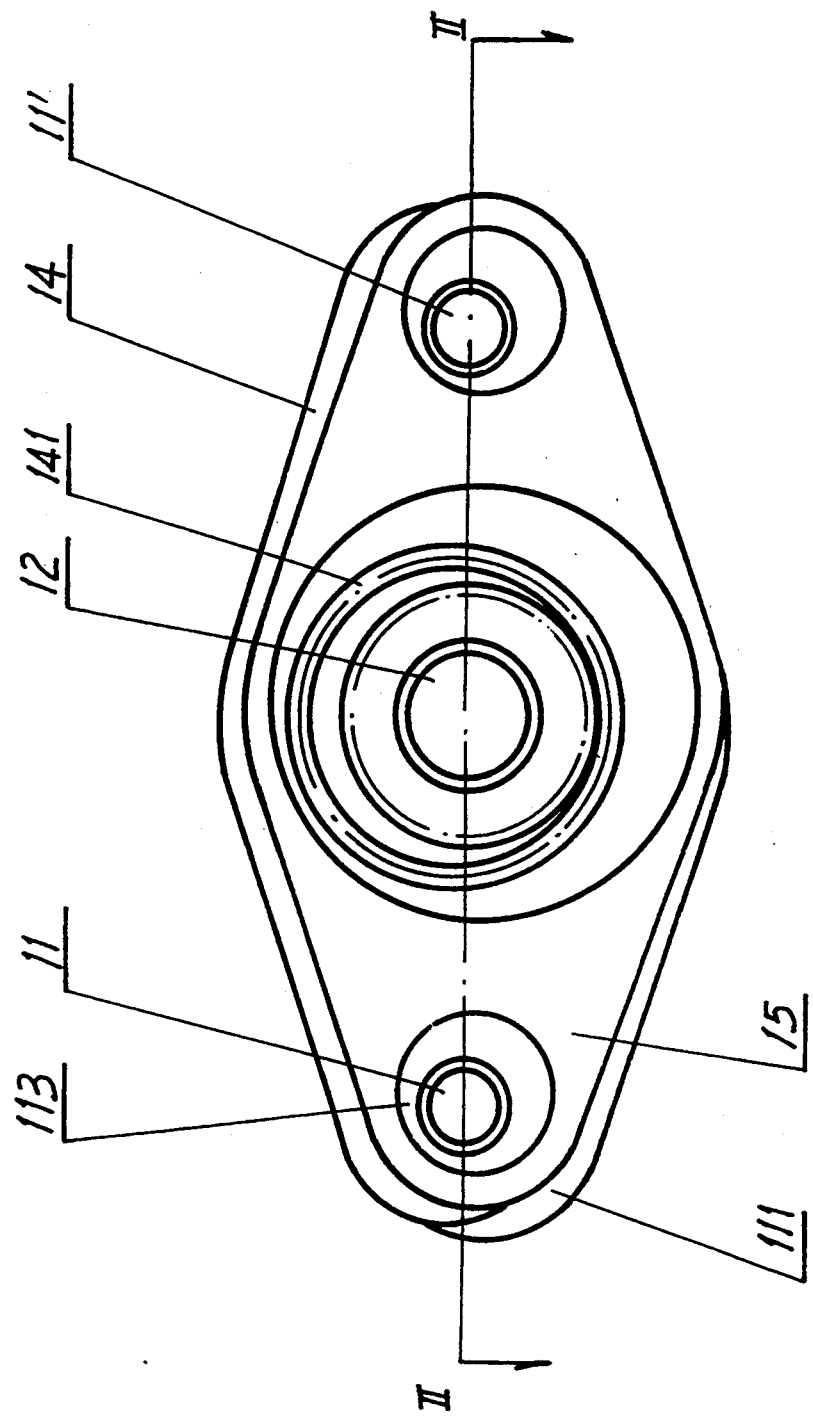
FIG. 1 is a front view of the first embodiment of the transmission unit according to the present invention.
Figure 2:
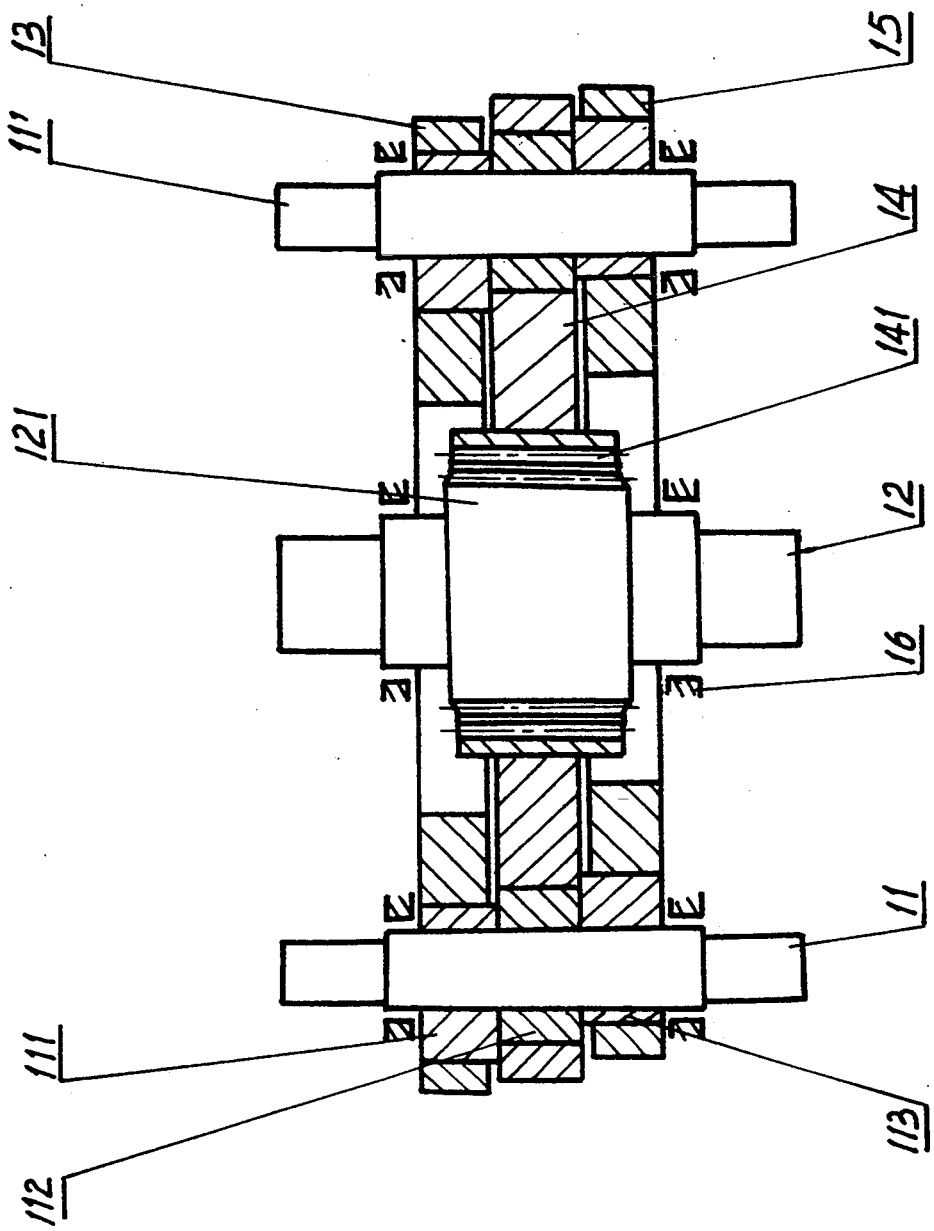
FIG. 2 is a sectional view taken along the line II—II in FIG. 1. The low-speed and high-speed shafts are not sectioned.
Figure 3:
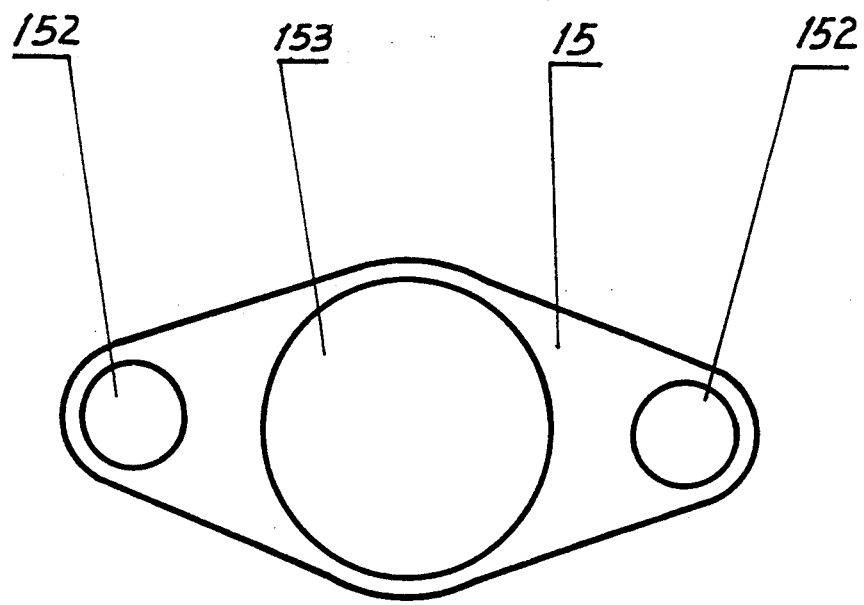
FIG. 3 is a front view of a balancing plate of the transmission unit shown in FIG. 1.
Figure 4:
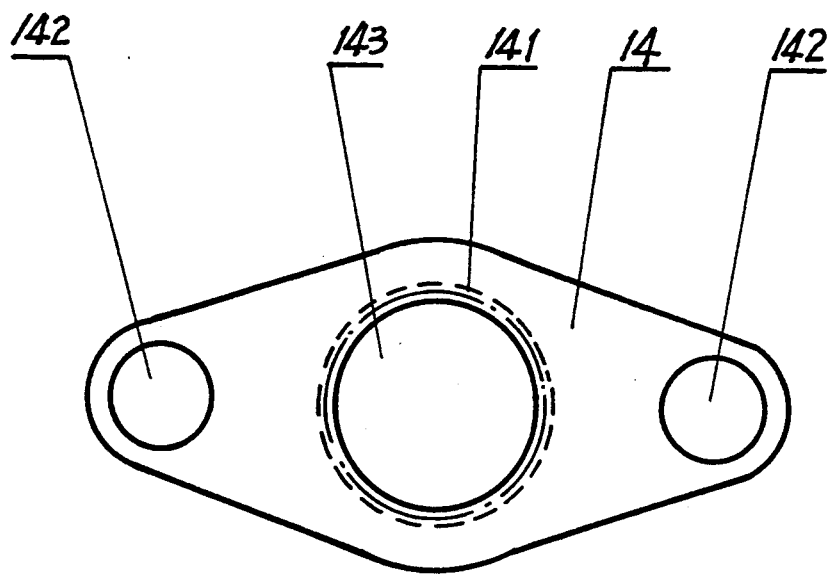
FIG. 4 is a front view of the driving plate of the transmission unit shown in FIG. 1.

Referring now to FIGS. 1 and 2 which show the first embodiment according to the invention, the planetary transmission unit comprises high-speed shafts 11, 11' and a low-speed shaft 12. These shafts are rotatably supported with bearings 16 provided in the case (not shown). Since the high speed shaft 11' may have the same arrangement as the shaft 11, the following description will be given using only the high-speed shaft 11 as an example. Eccentric sleeves 111, 112 and 113 are rigidly and serially positioned on the high-speed shaft 11. The circumferential arrangement, i.e. the eccentric directions, of the eccentric sleeves is made according to the dynamic equilibrium method, a computing method which is well known to those skilled in the art. Balancing plates 13, 15 and a driving plate 14 are rotatably mounted on the eccentric sleeves respectively. The structures of the balancing plate and the driving plate are shown in the FIGS. 3 and 4. Each one of the end portions of the driving plate 14 defines a mounting hole. 142, and the center portion of the driving plate 14 defines a driving hole 143. Along the inner surface of the driving hole 143, a ring gear 141 is provided which may be either integral with or separate from the driving plate. In the present embodiment, the ring gear 141 is rigidly mounted along the inner surface of the driving hole 143. The balancing plate 15 has mounting holes 152 at its end portions and a shaft-passing hole 153 at the centre portion. The shaft-passing hole 153 of the plate 15 has a predetermined size to ensure that the plate will not interfere with the movement of the low-speed shaft when the low-speed shaft 12 passes therethrough and rotates therein. The balancing plate 13 may have a different shape from the plate 15, but in the present embodiment, the two plates 13 and 15 have a similar structure. When assembled, the balancing plates 13 and 15 are respectively rotatably mounted on the eccentric sleeves 111 and 113, and the driving plate 14 is rotatably mounted on the eccentric sleeve 112. As shown in FIG. 1, the eccentric directions of the three eccentric sleeves are different. Therefore, when the plates are assembled on the high-speed shafts, they have staggered positions. The fitting between each plate and its corresponding eccentric sleeves may be in such a manner that the eccentric sleeves are directly positioned in the mounting holes of the plate with a sliding fit between the outer surfaces of the sleeves and the inner walls of the mounting holes. Preferably, the eccentric sleeves are positioned in the mounting holes through rolling bearings., which will be described below in detail.

The low-speed shaft 12, which extends through the shaft-passing holes of the balancing plates 13, 15 and the driving hole of the driving plate 14, has an external gear 121 rigidly mounted thereon. The position of the gear 121 on the shaft 12 is arranged so that when the low-speed shaft 12 is assembled through the plates, the gear 121 is in the driving hole 143 of the driving plate 14 and engages with ring gear 141. The number of the teeth of the gear 121 is for example 1, 2, 3 or 4 fewer than the number is ring gear 141, and, when it meshes with the ring gear 141, the center axis of the external gear 121 is not aligned with the center axis of the ring gear 141 in order to achieve the engagement. With this arrangement, the engagement of the external gear 121 and ring gear 141 may bring about a speed transmission according to the method of planetary gearing with a small difference between teeth.

In practice, the power is input through the high-speed shaft 11. The eccentric sleeves rotate at the same times together with high-speed shafts 11, 11'. Under the driving force of the eccentric sleeves, the balancing plates 13, 15 and the driving plate 14 are in a plane motion (which is similar to the motion pattern of a planar four-link mechanism) and the ring gear 141 only revolves around the external gear 121 and does not rotate. As shown in FIG. 1, the driving plate 14 has a position at nearly the highest point, and the ring gear 141 engages the external gear 121 at a lower point. Supposing that the ring gear 141 has one more tooth than the external gear 121, when the transmission unit works, the ring gear 141 makes a revolution round the external gear 121, and the teeth of the gear 141 mesh serially with the teeth of the gear 121 during a revolution of the ring gear 141. Because each engagement is brought about by means of only one tooth of the ring gear 141 meshing with one tooth of the external gear 121, interference is avoided. When the transmission unit starts to work, the first tooth of the gear 141 meshed with the first tooth of the gear 121, and then the second tooth of the gear 141 gradually meshes with the second tooth of the gear 121 with the disengagement of the first pair of meshing teeth. When the driving plate 14 nearly finishes a revolution, the second to last tooth of the ring gear 141 engages the last tooth of the external gear 121. Then the last tooth of the gear 141 will have to engage with the first tooth of the external gear 121, because the ring gear 141 has one tooth more than the external gear 121, resulting in a rotation of one-tooth degree of the external gear. In this manner the transmission from the high-speed shaft 11, 11' to the low-speed shaft 12 through the engagement of the gears 121 and 141 is achieved.

When the transmission unit in the embodiment operates, the balancing plates 13, 15 do not hinder the rotation of the low-speed shaft 12 because of the shaft-passing holes formed in the balancing plates. Under the forces of the corresponding eccentric sleeves, the balancing plates planar are in motion similar to that of the driving plate to help the driving plate overcome the extreme left and right dead points during its motion.

Figure 5:
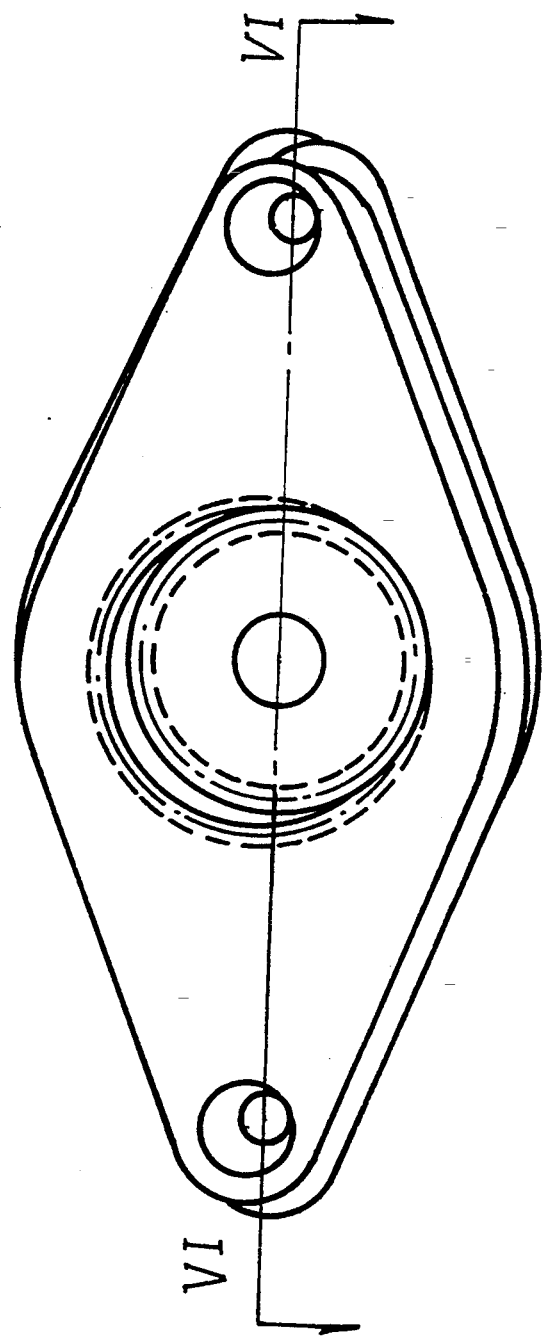
FIG. 5 is a front view of the second embodiment of the transmission unit according to the present invention.
Figure 6:
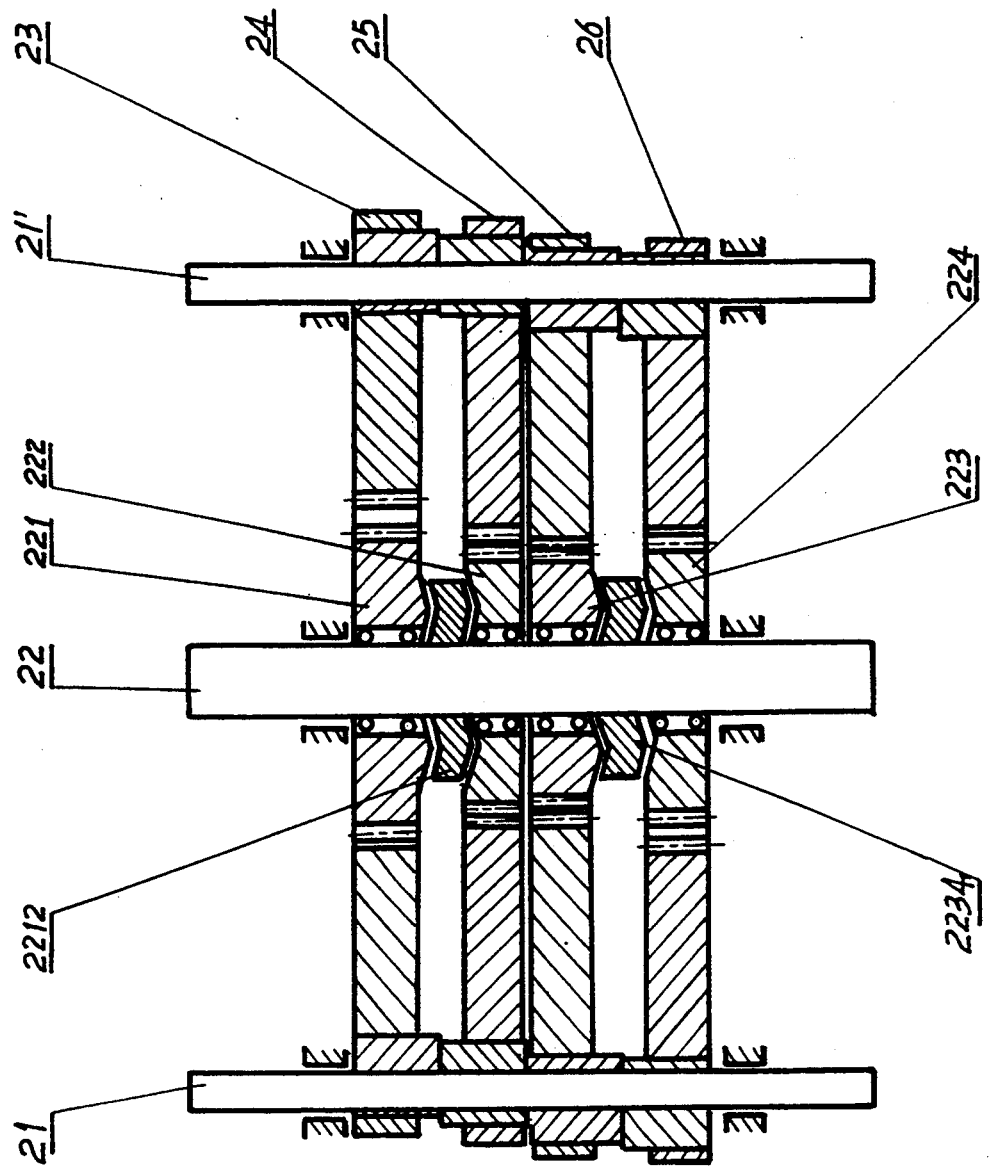
FIG. 6 is a sectional view taken along the line VI—VI in FIG. 5. The low-speed and high-speed shafts are not sectioned.

FIGS. 5 and 6 show the second embodiment of the invention. The difference between this embodiment and the one desired above is that a plurality of external gears are rotatably provided on the low-speed shaft to engage a corresponding number of driving plates provided on high-speed shafts. In this embodiment, four driving plates and four gears are provided, and the embodiment does not includes a special balancing plate.

As shown in FIG. 6, the high-speed shaft 21 has the same structure as the shaft 21'. Each of the high-speed shafts is fitted with four eccentric sleeves whose eccentric directions are arranged according to the dynamic equilibrium method. Four driving plates 23, 24, 25, and 26, having a similar structure as those in the above embodiment, are rotatably fitted on the corresponding eccentric sleeves on the high-speed shafts. A ring gear is rigidly mounted along the inner surface of the driving hole of every driving plate. It shall be noted that in this embodiment the center of the pitch circle of each ring gear is required to have the same position with respect to the mounting holes of its corresponding driving plate on which it is positioned.

Figure 11:
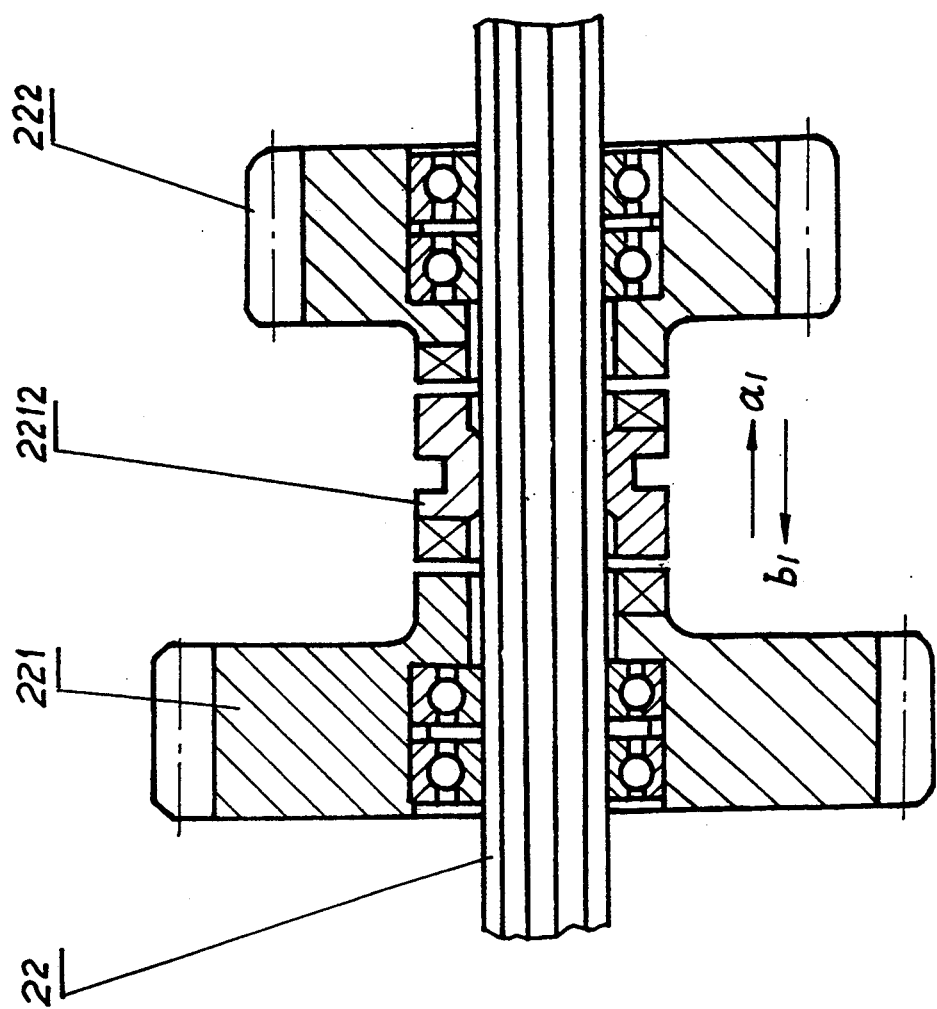
FIG. 11 shows the fitting structure of two external gears, a low-speed shaft and a clutch in the transmission unit according to the present invention.

As mentioned above, four external gears 221, 222, 223, and 224 are rotatably mounted on the low-speed shaft 22. These four gears have such positions on the shaft 22 that each one can mesh with a ring gear in the driving hole when the low-speed shaft is placed through the driving plates. A double-way clutch 2212 is provided on the shaft 22 between the gears 221 and 222, and a double-way clutch 2234 is provided between the gears 223 and 224. FIG. 11 shows the fitting relation among the external gears 221, 222, the low-speed shaft 22 and the double-way clutch 2212. The external gears 223, 224, the low-speed shaft 22 and the double-way clutch 2234 have the same fitting structure as the arrangement described above. As shown in FIG. 11, the low-speed shaft 22 may be a spline shaft, and a double-way clutch 2212, for example a jaw clutch, is slidably fitted thereon. The double-way clutch 2212 has three positions: the position where it engages with the external gear 221, the position where it engages with the external gear 222, and a neutral position. Moving along the direction indicated by arrow a1, the double-way clutch 2212 forms a rigid mechanical junction between the gear 222 and the shaft 22. Moving along the direction b1, the rigid mechanical junction between the gear 221 and the shaft 22 is formed. When the clutch stays at its neutral position as shown in the FIG. 11, the external gears 221, 222 run idle.

The low-speed shaft 22 is positioned through the driving holes of the driving plates, each of which is fitted on a corresponding eccentric sleeve, and the external gears on the low-speed shaft 22 engage the ring gears in the driving holes. Because each external gear and its corresponding ring gear engage each other and have a small difference, for example 1, 2, 3, or 4, in the number of teeth, this engagement can achieve a planetary transmission with a small difference between teeth.

In practice, the power is input from for example the high-speed shaft 21, and then the driving plates 23, 24, 25, and 26 are respectively in planar motion under the force of the eccentric sleeves, whereby the external gears on the low-speed shaft are forced to rotate. When the clutch 2212 is in the position where it engages the external gear 221 and the clutch 2234 is in its neutral position, the shaft 22 rotates together with the gear 221 under the action of the gear 221. At this time, the other driving plates 24, 25 and 26, under the action of their corresponding eccentric sleeves, run idle, although the corresponding external gears are forced by the plates to rotate. Because those driving plates do not transmit motion to the shaft, they provide the same function as that of the balancing plates in the above embodiment. That is, they function only to help the driving plate to overcome the right and left most dead points of its motion, and to assure a smooth movement. Therefore, in this embodiment, every plate may either function as a balancing plate or a driving plate according to the positions of the clutches.

It shall be noted that when the transmission unit works, only one clutch is allowed to be in the work state, to avoid damage of the various parts.

Moreover, as mentioned above, under the condition that the external gear 221, through a clutch 2212, drives the low-speed shaft 22 to rotate, the speed radio of the transmission unit is that of the external gear 221 and the ring gear of the driving plate 23. If the ring gears and their corresponding external gears are provided with different teeth, several different speed ratios can be obtained from the low-speed shaft by controlling the positions of the clutches. In this embodiment, by controlling the positions of the clutches 2212 and 2234 and giving the different number of teeth of the four ring gears and four external gears, four speed ratios can be achieved from the low-speed shaft 22.

In this embodiment, in each work state, only one external gear engages only one ring gear to transmit motion, thus, overcoming the disadvantage of interference of the prior art which results from the engagement of the several teeth of a external gear meshing with its three corresponding ring gears at the same time.

As an alternate embodiment, only three driving plates with ring gears may be provided. For example, only driving plates 23, 24 and 25 are provided, and each of those external gears can have a rigid mechanical junction with the low-speed shaft through a one-way clutch or a double-way clutch. Furthermore, as another alternate, among the plates 23, 24, and 25, the plate 23 for example, may not be provided with a ring gear. This plate 23 functions as a balancing plate, and two speed ratios can be obtained from the low-speed shaft by means of a double-way clutch engaging the other two driving plates.

Figure 7:
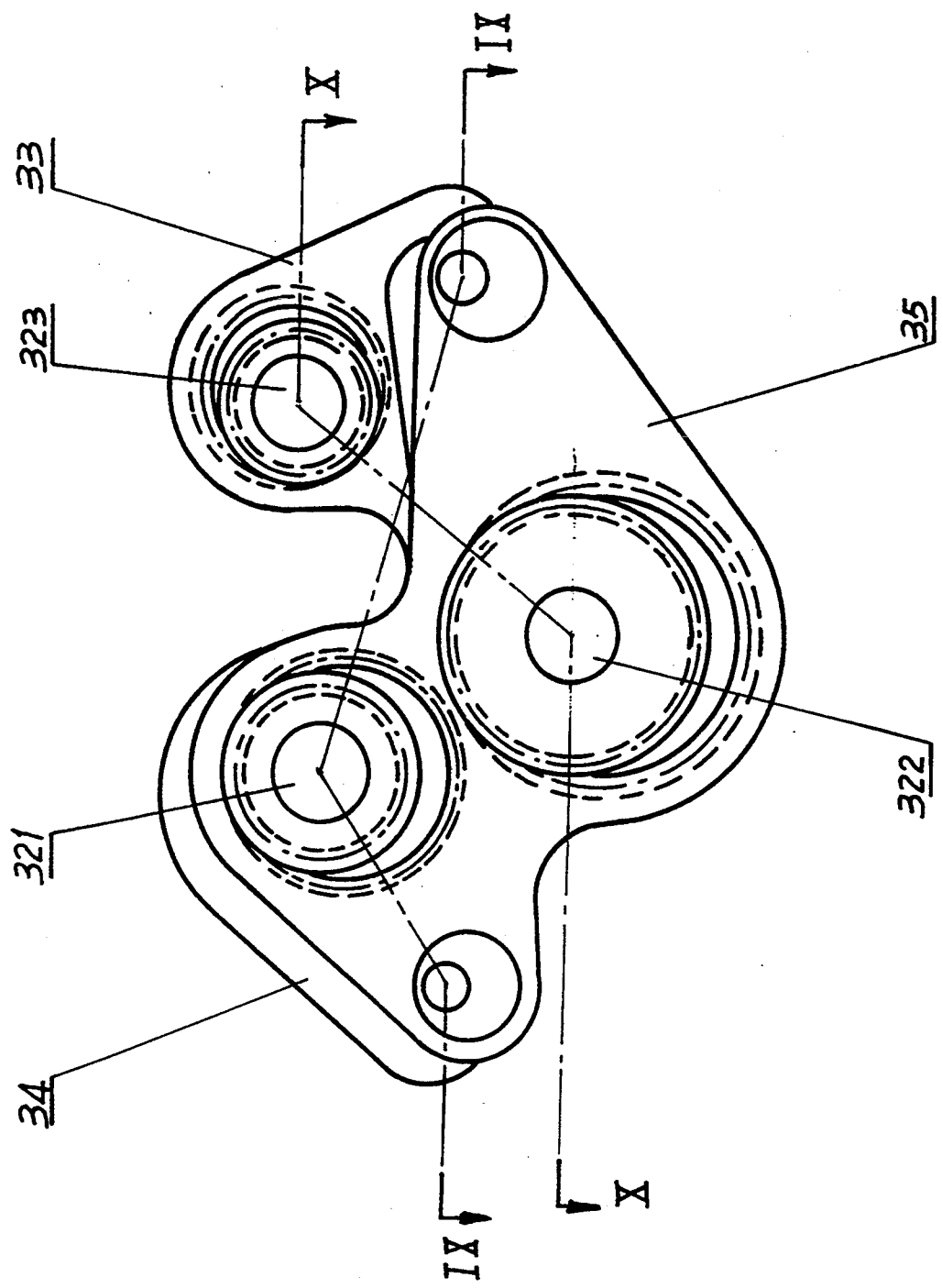
FIG. 7 is a front view of the third embodiment of the transmission unit according to the present invention.
Figure 8:
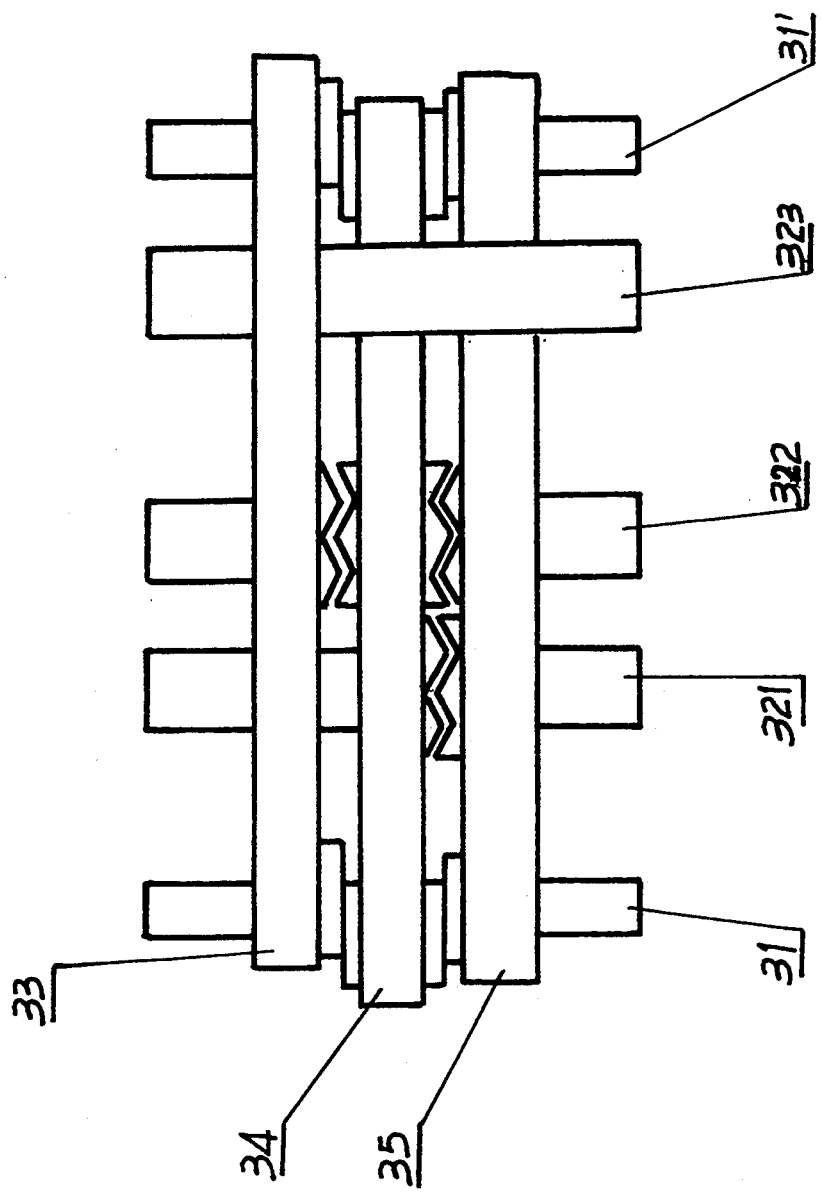
FIG. 8 is a top view of the transmission unit shown in FIG. 7.
Figure 9:
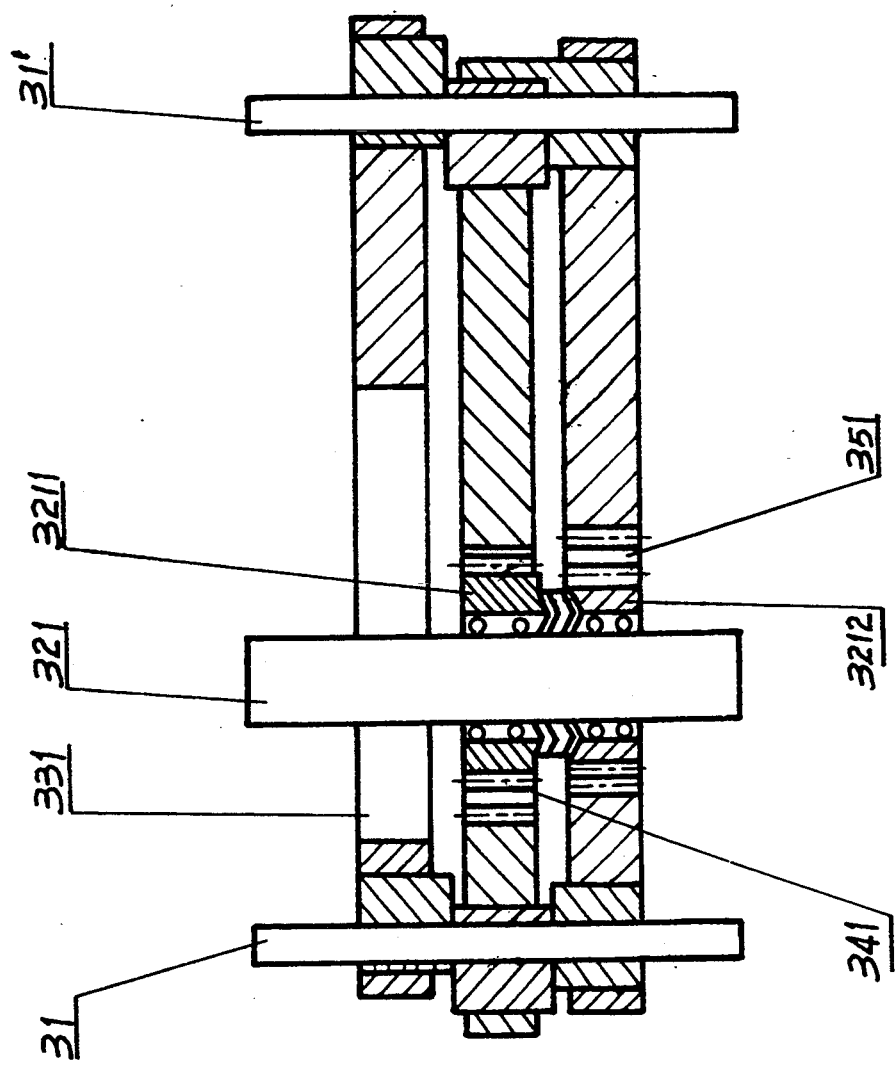
FIG. 9 is a sectional view taken along line IX—IX in FIG. 7.
Figure 10:
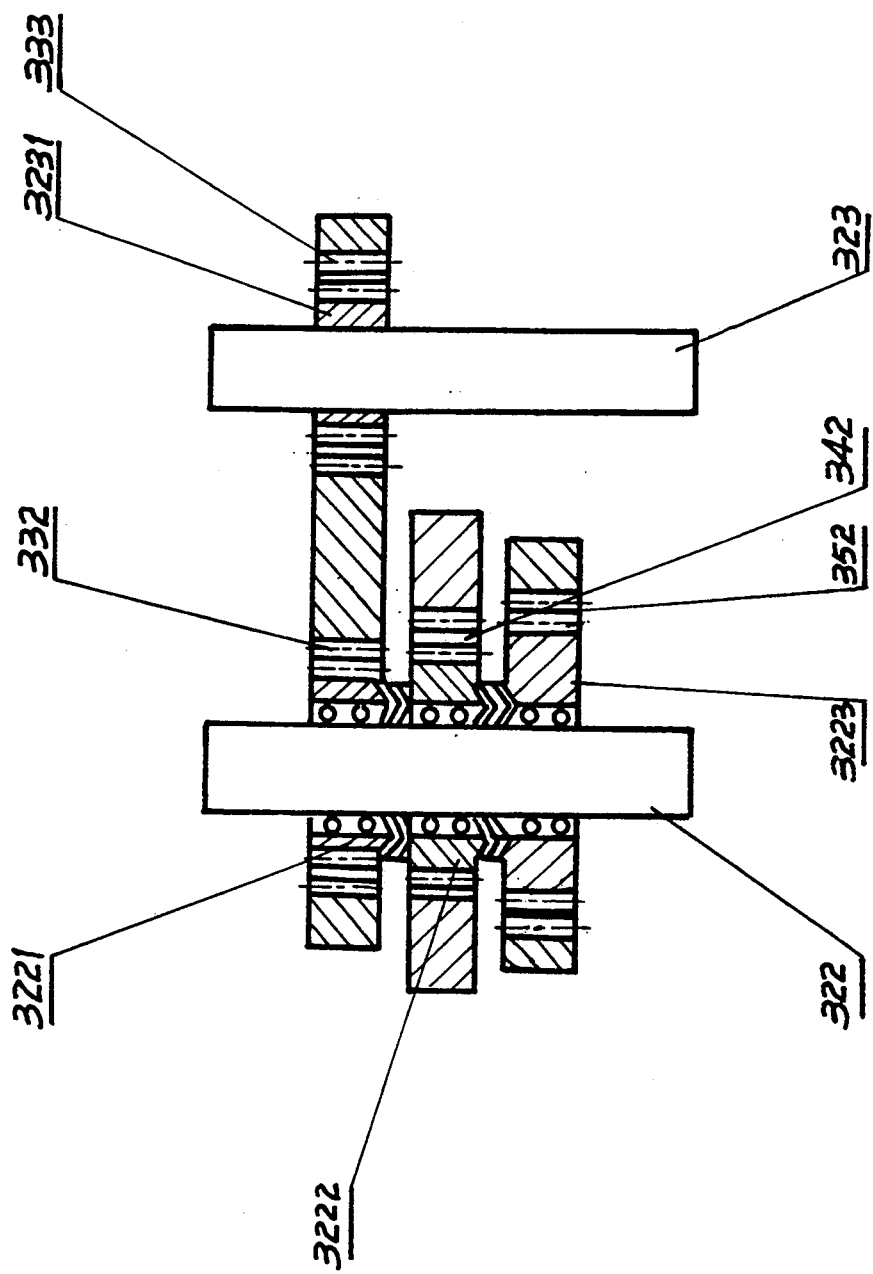
FIG. 10 is a sectional view taken along line X—X in FIG. 7.

FIGS. 7–10 show the third embodiment of the invention. As shown in FIGS. 7 and 8, two high-speed shafts 31, 31', three low-speed shafts 321, 322, 323, and three driving plates 33, 34, 35 are provided. As in the embodiments described above, the eccentric sleeves fitted on the high-speed shafts have numbers corresponding to those of the driving plates. The driving plate 33 has two mounting holes, one shaft-passing hole 331 and two driving holes 332, 333. The mounting holes fit on the high-speed shafts 31 and 31'. Two ring gears are respectively mounted along the inner walls of driving holes 332, 333. The driving plates 34 and 35 have two driving holes 341, 342, and 351, 352, respectively, along the inner wall of each of which is rigidly mounted a ring gear. The shaft-passing hole 331 of the driving plate 33 has a position corresponding to that of the driving holes 341, 351 of the driving plates 34, 35. The center of each of the pitch circles of the ring gears in the driving holes 341, 351 has a same position with respect to the mounting holes of the corresponding plate. The driving holes 332, 342 of the driving plate 33, 34 correspond to the driving hole 352 of the driving plate 35. The positions of the pitch circles of the ring gears mounted in the holes 332, 342 with respect to the mounting holes of the driving plate 33, 34 are the same as the position of the pitch circle of the ring gear mounted in the hole 352 with respect to the mounting holes of the driving plate 35. The low-speed shaft 321 extends through the shaft-passing hole 331 and the driving holes 341, 351. The external gears 3211 and 3212 are rotatably mounted on the low-speed shaft 321 and have the positions on the shaft 321 corresponding to the ring gears in the driving holes 341 and 351. By means of the movement of a clutch, the gears 3211 and 3212 can engage and disengage the low-speed shaft 321. The low-speed shaft 322 extends through the driving holes 332, 342, 352. External gears 3221, 3222, and 3223 are rotatably mounted on the low-speed shaft 322 and have positions thereon corresponding to those of the ring gears in the driving holes 332, 342 and 352. The engagement and disengagement of the external gears 3222 and 3223 are controlled by means of a double-way clutch. A one-way clutch controls the rigid mechanical junction between the external gear 3221 and the low-speed shaft 322. On the low-speed shaft 323, an external gear 3231 is rigidly mounted. The transmission and control method of this embodiment is the same as the embodiments described above.

Moreover, this embodiment requires that one low-speed shaft is permitted to engage with only one external gear through a clutch, as does the second embodiment. That is, with respect to one low-speed shaft, only one driving plate is permitted to work. Therefore, the non-working driving plates in this embodiment function as balancing plates, which assures that the driving plate, in the work state with respect to one low-speed shaft, is able to overcome the dead points of its motion with the help of the other non-working driving plate to bring about a smooth movement of the working driving plate.

Furthermore, by having a different number of teeth of the gears and controlling the working position of the clutches, two and three different speeds can be obtained from the low-speed shafts 321 and 322.

Figure 12:
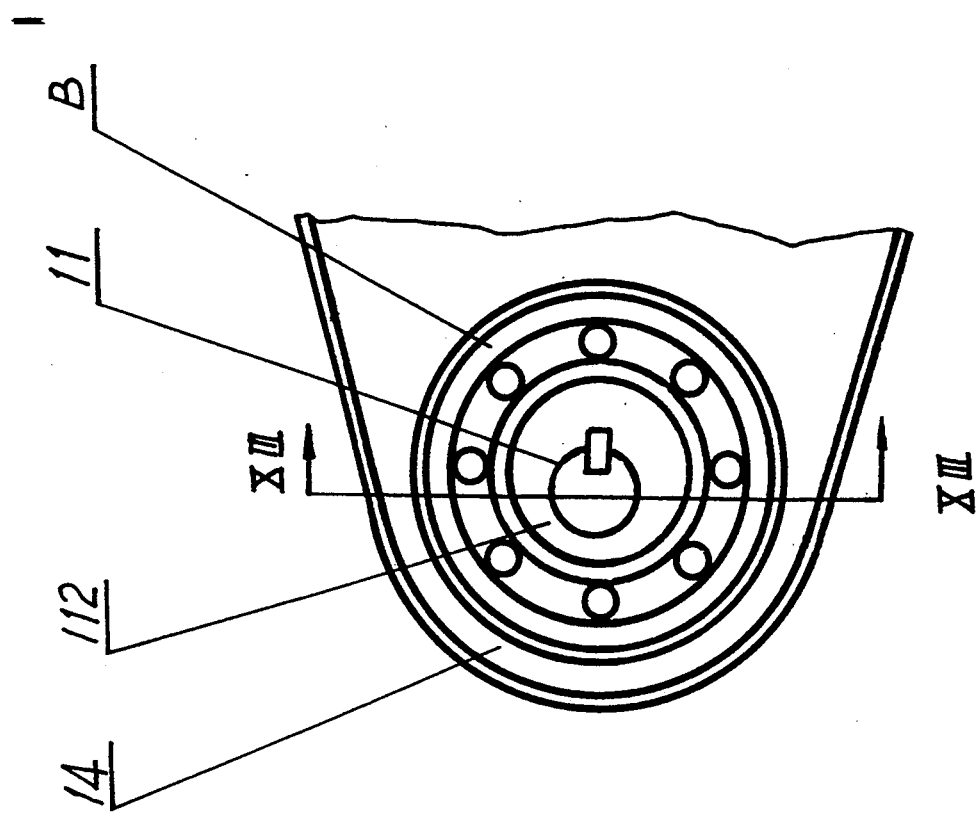
FIG. 12 is a enlarged partial view showing how a rolling bearing is positioned in the mounting hole of a driving balancing plate.
Figure 13:
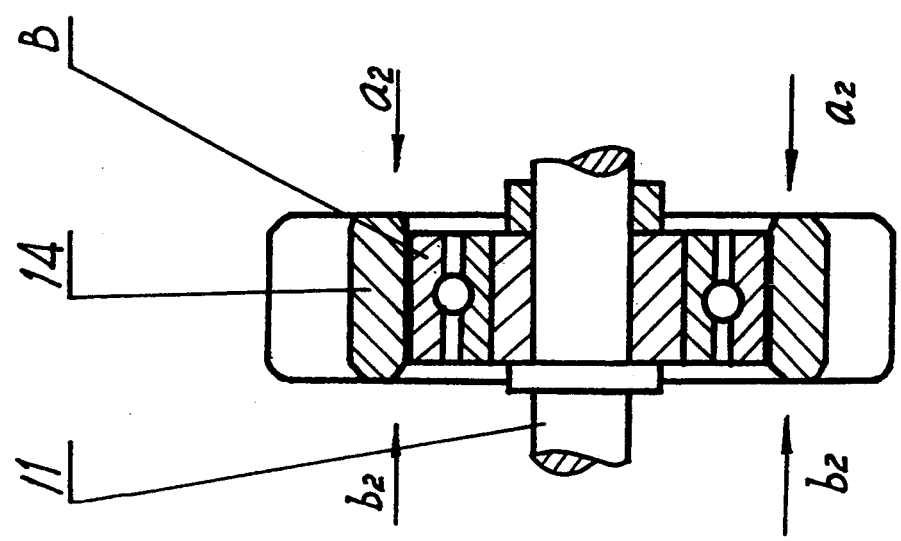
FIG.13 is a sectional view taken along line XIII—XIII in FIG. 12.

FIGS. 12 and 13 show the fitting structure of the mounting hole of a driving balancing plate and an eccentric sleeve rigidly mounted on the high-speed shaft. The fitting of the driving plate 14 and the eccentric sleeve 112 in the first embodiment will be described as an example. The inner ring of the rolling bearing B is rigidly attached on the eccentric sleeve 112. The mounting holes 142 of the driving plate 14 have a little greater size than the outer ring of the bearing B. When the driving plate 14 is fitted on the bearing B, there is little space between the outer ring of the bearing B and the inner wall of the mounting hole. The outer ring of the bearing B is axially positioned in the mounting hole so that a special tool is used to press the right and/or left end portions of the mounting hole in the direction a2 and/or b2 to have these portions of the hole deformed. The outer ring of the bearing B is positioned so that it may rotate with respect to the inner wall of the mounting hole, and its axial movement is restricted by the deformation of mounting hole. Using this method to position the bearing B, when its inner ring makes for example 1000 rotations, the outer ring will make $\frac{1}{4}$ to 178 of a rotation with respect to the inner wall of the mounting hole. This changes the load direction on the bearing B and gives the bearing B a uniformly circumferentially load and friction to overcome the disadvantage of the prior art, in which, the outer ring of the bearing B is deformed because the tips of screws are used to position it. Moreover, in the positioning method mentioned above, the removal of the bearing B is easy to achieve by applying a pressing force on it in the direction a2 or b2, because the deformation of the mounting hole is very small. Therefore it is convenient for the user to replace the bearing B.

According to the present invention, the transmission unit may be one the high-speed shaft is the input shaft and the low-speed shaft is the output shaft; and also one in which the low-speed shaft is the input shaft and the high-speed shaft is the output shaft. Moreover, the positions of the high-speed shafts and low-speed shaft(s) may be arranged in the transmission unit according to any desired requirement. The driving balancing plate can also be designed to any desired shape.

While the description of the invention has been given with respect to preferred embodiments, it is not to be constructed as limited to those embodiments. Variations and modifications will occur to those skilled in the art. Reference is made to the appended claims for a definition of the invention.

What is claimed is:

1. A single-ring-gear planetary transmission unit with a small difference between teeth, comprising:
   at least one low-speed shaft which is provided for axial rotation;
   at least one external gear provided on the low-speed shaft;
   two high-speed shafts provided for axial rotation;
   at least two eccentric sleeves rigidly mounted on each of the high-speed shafts;
   at least one driving plate with two mounting holes which are rotatably fitted with the eccentric sleeves and at least one driving hole which is provided with one ring gear having a few more teeth than its corresponding external gear to engage with the low-speed shaft; and at least one balancing plate with two mounting holes that fits on the high-speed shaft through an eccentric sleeve and one or more shaft-passing portions; said low-speed shaft passes through the driving hole of at least one driving plate, and the external gear on the low-speed shaft is positioned to mesh with the ring gear in the driving hole to achieve a planetary transmission with a small difference between teeth.

2. A single-ring-gear planetary transmission unit according to claim 1 wherein the transmission unit includes three eccentric sleeves rigidly and serially positioned on each of the high-speed shafts in an eccentric direction arrangement so that their directions assure a smooth movement of the transmission unit; wherein the driving plate is rotatably mounted on one of the eccentric sleeves; wherein the unit includes two balancing plates rotatably mounted on the other eccentric sleeves; wherein the shaft-passing portion of the balancing plate is a shaft-passing hole; wherein the driving plate has a driving hole; and wherein the low-speed shaft passes through the driving hole and the shaft-passing holes.

3. A single-ring-gear transmission unit according to claim 1 wherein said driving plate can have one or more shaft-passing portions.

4. A single-ring-gear transmission unit according to claim 1 wherein said balancing plate has at least one driving hole.

5. A single-ring-gear transmission unit according to claim 1, 3 or 4 wherein a plurality of external gears are rotatably mounted on each of at least one low-speed shaft; at least one clutch is provided on said low-speed shaft, whereby external gears can form a mechanical junction with said low-speed shaft;

all pitch circles of the gear rings of the plates, through which the low-speed shaft passes, have the same position with respect to the mounting holes of the corresponding plates; the low-speed shaft passes through the corresponding driving holes; and each external gear meshes with one ring gear.

6. A single-gear planetary transmission unit according to claim 5 wherein the transmission unit comprises a low-speed shaft with four external gears rotatably mounted thereon, and four plates, each of which is provided with a driving hole with a ring gear.

7. A single-ring-gear planetary transmission unit according to claim 5 herein said unit includes three low-speed shafts; a first low-speed shaft with two external gears rotatably mounted thereon; a second low-speed shaft with three external gears rotatably mounted thereon; and a third low-speed shaft with an external gear rigidly mounted thereon.

8. A planetary transmission unit with small difference between teeth according to claim 1 wherein the plate is rotatably fitted on a corresponding eccentric sleeve by means of a rolling bearing, and a clearance fit is provided between the outer ring of the bearing and the inner wall of the mounting hole of the plate; and the two end portions of the mounting hole have a little deformation to position the outer ring of the rolling bearing axially.

9. A single-ring-gear planetary transmission unit according to claim 1 wherein said ring gear may be integral with or separate from the inner wall of its corresponding driving holes.

10. A single-ring-gear planetary transmission unit according to claim 5 wherein each of the gear trains in which a external gear engages with a corresponding ring gear has a different speed ratio, thereby obtaining a plurality of speed ratios from the output shaft by means of controlling the working positions of said clutch.

11. A single-ring-gear planetary transmission unit according to claim 10 wherein said clutch may be a jaw clutch.

* * * * *

UNITED STATES PATENT AND TRADEMARK OFFICE
CERTIFICATE OF CORRECTION

PATENT NO. : 5,425,683
DATED : June 20, 1995
INVENTOR(S) : Yu An Bang

It is certified that error appears in the above-indentified patent and that said Letters Patent is hereby corrected as shown below:

Claim 6, column 10, line 4, delete "single-gear" and substitute therefor -- single-ring-gear --.

Claim 7, column 10, line 10, delete "herein" and substitute therefor -- wherein --.

Signed and Sealed this

Twentieth Day of August, 1996

Attest:

BRUCE LEHMAN

Attesting Officer    Commissioner of Patents and Trademarks